United States Patent [19]

Koehler

[11] Patent Number: 4,822,692

[45] Date of Patent: Apr. 18, 1989

[54] SEAMLESS POROUS METAL ARTICLE AND METHOD OF MAKING

[75] Inventor: Paul C. Koehler, Dryden, N.Y.

[73] Assignee: Pall Corporation, Glen Cove, N.Y.

[21] Appl. No.: 120,172

[22] Filed: Nov. 12, 1987

Related U.S. Application Data

[63] Continuation of Ser. No. 935,644, Nov. 26, 1986, abandoned, which is a continuation of Ser. No. 697,391, Feb. 1, 1985, abandoned.

[51] Int. Cl.$^4$ .................... B22F 3/06; B32B 5/18
[52] U.S. Cl. .................... 428/547; 428/550; 428/566; 419/2; 419/6; 419/40; 427/203; 427/231; 427/241; 427/244; 210/510.1
[58] Field of Search .................... 419/2, 6, 23, 40; 428/547, 550, 566; 427/133, 135, 181, 183, 203, 205, 240, 241, 244; 210/510.1; 261/94

[56] References Cited

U.S. PATENT DOCUMENTS

| | | | |
|---|---|---|---|
| 2,341,739 | 2/1944 | Olt | 75/22 |
| 2,390,160 | 12/1945 | Marvin | 29/149.5 |
| 2,462,821 | 2/1949 | Wellman | 29/152.2 |
| 2,580,652 | 1/1952 | Brennan | 29/189 |
| 3,255,281 | 6/1966 | Alexander | 264/3 |
| 3,313,621 | 4/1967 | Mott 3rd | 75/212 |
| 3,888,662 | 6/1975 | Boeckeler | 75/203 |
| 4,261,933 | 4/1981 | Ewing et al. | 261/122 |
| 4,287,068 | 9/1981 | Bewley | 210/510 |

FOREIGN PATENT DOCUMENTS

| | | |
|---|---|---|
| 0057848 | 8/1982 | European Pat. Off. . |
| 47-14249 | of 1972 | Japan . |
| 554110 | 6/1943 | United Kingdom . |
| 562934 | 7/1944 | United Kingdom . |
| 571139 | 8/1945 | United Kingdom . |
| 837299 | 6/1960 | United Kingdom . |
| 1348809 | 3/1974 | United Kingdom . |

*Primary Examiner*—John F. Terapane
*Assistant Examiner*—Eric Jorgensen
*Attorney, Agent, or Firm*—Leydig, Voit & Mayer

[57] ABSTRACT

A method for making seamless, porous metal articles comprising:
  (a) rotating a mold containing a stabilized suspension of a metal particulate at a rate and for a time such that the particulate is separated from the suspension and distributed on the interior wall of the mold, thereby forming a structure conforming to the interior wall of the mold, the rate of rotation being sufficiently high that at least about 100 Gs of centrifugal acceleration is achieved at the interior wall of the structure,
  (b) drying the formed structure to provide a structure having green or unsintered strength, and
  (c) sintering the dried structure to remove volatile material and fuse the individual particles of the particulate to each other to form the seamless, porous metal article.

Metal articles in accordance with the invention have substantially uniform diameters, thicknesses and pore structures, have Bubble Point ratios of 1.5 or less, and find particular use as filters.

30 Claims, No Drawings

SEAMLESS POROUS METAL ARTICLE AND METHOD OF MAKING

This application is a continuation of U.S. application Ser. No. 935,644, filed Nov. 26, 1986, which is a continuation of U.S. application Ser. No. 697,391, filed Feb. 1, 1985, both now abandoned.

TECHNICAL FIELD

This invention relates to seamless porous metal articles. More particularly, this invention is directed to seamless porous metal filters and a method for making them.

BACKGROUND ART

Metal filters have long been used for a variety of applications. For example, porous stainless steel filters prepared from sintered metal particulate, e.g., stainless steel powder, have found use in a variety of processes where high pressure drops are acceptable and in applications where relatively fine filtration capability must be combined with mechanical strength, resistance to high temperatures and/or resistance to chemical attack. Such applications include the filtration of fine catalysts used in fluidized bed catalytic processes where elevated temperatures are encountered, e.g., fluid cat cracking, and in the manufacture of high fidelity recording tapes. Still another use of such filters is in the filtration of molten resin used in the manufacture of polymeric films and fibers as, for example, polyester film.

One form of commercially available metal filters in cylindrical form is typically prepared from sheet material which is formed into a cylindrical shape and then longitudinally welded. Unfortunately, this method of manufacture results in a structure sensitive to rapid temperature change, i.e., uneven heating and cooling can ultimately result in cracking and failure of the structure adjacent the seam weld. Other drawbacks to such welded structures are nonuniform blow back characteristics and the inability to make relatively small diameter structures, e.g., at one-half inch diameter, the welded seam occupies a significant portion of the overall surface available for filtration, limiting the onstream filter life for a given cycle.

DISCLOSURE OF INVENTION

In accordance with the subject invention, seamless porous metal articles, and a method of forming them, are provided which substantially overcome the limitations described above with regard to presently available metal filters of the type described above. Additionally, the articles in accordance with this invention have uniform pore characteristics, hence longer onstream life, making them particularly desirable in filtration applications The method in accordance with this invention provides a means for preparing seamless porous metal articles or structures, particularly useful as filters, in which the porosity of the resulting structure can be accurately tailored by controlling (1) the makeup of the compositions used to prepare the structure and (2) readily measurable process variables.

In accordance with the invention, a method is provided for making a seamless, porous metal article comprising:

(a) rotating a mold containing a stabilized suspension of a particulate at a rate for a time such that the particulate is separated from the suspension and distributed on the interior wall of the mold, thereby forming a structure conforming to the interior wall of the mold, the rate of rotation being sufficiently high that at least about 100 Gs of centrifugal acceleration is achieved at the interior wall of the structure;

(b) drying the formed structure to provide a dried structure having green or unsintered strength; and (c) sintering the dried structure to remove volatile material and fuse the individual particles of said particulate to each other to form a seamless, hollow, porous structure.

Preferably, the mold is completely filled with the stabilized suspension prior to initiating rotation.

The metal articles in accordance with this invention are seamless, hollow porous structures of substantially uniform diameter, thickness and pore structure particularly useful as filters comprising metal particulate in which the individual particles of the particulate are bonded to each other. The porous metal articles have Bubble Point ratios (as defined below) of 1.5 or less.

BEST MODE FOR CARRYING OUT THE INVENTION

The stabilized suspension used to prepare seamless porous metal articles in accordance with this invention is comprised of a liquid medium, a metal particulate, a stabilizing agent and a binding agent. Preferably, a single constituent serves to both stabilize the dispersion of metal particulate and, upon drying of the suspension, to bind the individual particles to each other and to the container, thereby providing the requisite green or unsintered strength, i.e., a stabilizing binding agent is used.

Typically, the stabilized suspension of the metal particulate in the liquid medium is prepared by the following general procedure.

The stabilizing/binding agent is combined with the liquid medium, preferably water for ease of use and disposal, in an amount such as to provide the requisite concentration of the stabilizing/binding agent in the liquid medium. For the preferred stabilizing/binding agent, CARBOPOL 941, discussed below, the stabilizing/binding agent preferably comprises from about 0.1 percent to about 0.9 percent of the mixture, i.e., the stabilizing/binding agent and the liquid medium. The preferred stabilizing/binding agent is CARBOPOL 941, available from B. F. Goodrich Chemicals Company, which provides the medium with a relatively high viscosity. For example, in CARBOPOL 941/water mixture, where the CARBOPOL 941 comprises 0.35 percent by weight (based on the weight of the water), the viscosity is approximately 750 centipoise at 20 degrees Centigrade. When the CARBOPOL 941 comprises 0.9 percent of the mixture (based on the weight of the water), the viscosity of the mixture is approximately 1,200 centipoise. Mixtures of CARBOPOL 941 and water are preferred because the combination provides compositions having substantially consistent viscosities, i.e., mixtures of these constituents provide compositions with viscosities which are readily reproducible.

Based on the diameter of the largest particles of the metal particulate to be suspended in the stabilized suspension, a value for the viscosity of the stabilizing/binding agent-liquid medium mixture that will render the suspension sufficiently stable can be determined. The desired viscosity of the stabilized suspension in accordance with this invention is such that the suspension is capable of holding the metal particulate in suspension and thereby remaining substantially uniformly dispersed prior to lay down under the impetus of the centrifugal force generated in the rotating container. Knowing the desired viscosity of the stabilizing/binding agent-liquid medium mixture, the relative amounts of these constituents to be used in preparing the mixture can be determined. It is therefore desirable to use a stabilizing/binding agent which will, when mixed with the liquid medium to be used, produce a suspension having relatively consistent bulk viscosity values with regard to the relative amounts of constituents used and relatively constant viscosity values throughout the suspension. In general, less stabilizing/binding agent is used with finer metal particulates. This is due to the reduced tendency for finer particles to settle out.

The combination of stabilizing/binding agent and liquid medium (sometimes referred to herein as the carrier) is preferably mixed until uniform dispersion of the stabilizing/binding agent is obtained. The metal particulate material is then added and mixed with the stabilizing/binding agent-liquid medium mixture to provide a uniform stabilized dispersion or suspension of the metal particulate in the carrier. The weight ratio of the metal particulate to the carrier, i.e., the other components in the stabilized suspension, is typically from about 5:1 to about 1:1, preferably from about 4.5:1 to about 3.5:1. This ratio depends primarily on the desired thickness of the porous article and the interior volume of the mold or container.

The amount of particulate metal powder required for a given metal article can be determined by the following relation:

amount of particulate metal powder (weight) needed = $V_a \cdot \rho \cdot K$, where $V_a$ = annular volume of the finished seamless porous metal article, i.e., the volume occupied by the wall of the structure;
$\rho$ = the apparent density of the metal particulate powder; and
$K$ = the shrinkage factor.

The shrinkage factor, K, is determined empirically by measuring the wall thickness of the formed structure before and after sintering.

The viscosity of the stabilized suspension of dispersed metal particulate is preferably below the gel consistency so that, for ease of processing, the stabilized suspension can be poured. However, a gelled stabilized suspension and a high rate of rotation may be preferable when relatively large particles are used.

For some systems, the suspension of metal particulate in the liquid medium containing the stabilizing/binding agent is stable after a thorough mixing has been completed. By stable or stabilized is meant that the metal particulate material is in suspension and will not settle out at a rate fast enough to adversely affect the formation of the desired structure. That is, no settling or elutriation of particulate occurs prior to the initiation of rotation.

For many applications it is preferred to add an additional component to set up the stabilizing/binding agent. For example, the addition of a neutralizing base, ammonium hydroxide, to CARBOPOL 941 serves to neutralize the stabilized suspension and increase the viscosity to a substantial degree. Such systems are very thixotropic. i.e., they have a very high apparent viscosity when undisturbed (low shear condition) and, hence, settling of the suspended particulate is retarded. When vigorously agitated, they have a low effective viscosity and, hence, are very effective in dispersing the metal particulate. Since these suspensions are very stable, they may be prepared in advance of the time they are used without settling out of the metal particulate. Alternatively, stabilizing/binding agents may also be used which do not require the addition of another component to set up the suspension. CARBOPOL 941, the preferred stabilizing/binding agent, may be used with or without the addition of a neutralizing base. For example, with corrosive-sensitive metal particulate, neutralized CARBOPOL 941 is preferred because it is less acidic. In other cases, it may be preferable to use a viscosity-increasing agent to aid in stabilizing the suspension.

A variety of viscosity-increasing agents, which serve to stabilize the metal particulate suspension and also act as a binding agent when the liquid medium is removed by drying, may be used. Polyacrylic acid (available from B. F. Goodrich Chemical Company under the trade name CARBOPOL) is particularly desirable. As previously noted, CARBOPOL 941 is particularly preferred. CARBOPOL 941 has a molecular weight of about 1,250,000. CARBPOL 934 may also be used. It has a molecular weight of about 3,000,000. Other materials which can be used include carboxy methyl cellulose, carboxy ethyl cellulose, polyethylene oxide, sodium carboxy methyl cellulose, guar gum, alginates, methyl cellulose, and locust bean gum. In general, when water is used as the liquid medium, water compatible stabilizing/binding agents which volatilize and/or decompose substantially completely prior to or during sintering may be used.

The metal particulate can be of any of a variety of metal materials including alloys, various metals such as nickel, chromium, copper, molybdenum, tungsten, zinc, tin, gold, silver, platinum, aluminum, cobalt, iron and magnesium, as well as combinations of metals and metal alloys, including boron-containing alloys. Nickel/chromium alloys are preferred. Of these, the AISI designated stainless steels which contain nickel, chromium and iron are more preferred. Particularly preferred are the AISI 300 series of stainless steels, commonly referred to as the austenitic stainless steels. Other stainless steels within the preferred class are the martensitic stainless steels, maraging steels, 17-7 and 17-4 PH stainless steels, ferritic stainless steels, and Carpenter No. 20 alloy. Other alloys within the preferred class of nickel/chromium are the Hastelloys, the Monels and the Inconels, as well as a 50 weight percent nickel/50 weight percent chromium alloy. Multi-structured materials, such as duplexes of ferritic and austenitic stainless steel, may also be used. The metal particulate used may have various shapes, including dendritic, acicular, fibril, and spherical, and will typically have average particle sizes in the range of from about 1 to about 300 micrometers, preferably from about 20 to about 200 micrometers, and more preferably from about 25 to about 150 micrometers. The size of the metal particulate chosen for a particular application is related to the porosity in the finished seamless porous metal article.

The austenitic stainless steel porous articles in accordance with this invention are characterized by having low carbon residues, i.e., less than about 0.08 weight percent, more preferably less than about 0.05 percent, and typically 0.03 percent or less, e.g., 0.015 percent. Low product carbon content is due to the very low concentration of binder resin which, in turn, is made possible by tailoring the weight ratio of the metal particulate to carrier (stabilizing/binding agent and liquid medium) in the suspension. Typically, the amount of carbon present in the stabilized suspension by virtue of the stabilizing/binding agent is about 0.25 percent or less (based on the weight of the metal particulate). Part of this is lost during heat up in the sintering operation, and the residual quantity of carbon actually absorbed into the metal is reduced by chemical or physical processes which occur during sintering.

A low carbon content is particularly significant when working with austenitic stainless steels since austenitic stainless steels with carbon contents greater than 0.08 weight percent are susceptible to precipitation of chromium carbides at the grain boundaries which can cause corrosion under many conditions. This susceptibility to corrosion is exacerbated when austenitic stainless steel containing greater than 0.08 weight percent carbon has been exposed to a temperature in the range of from about 900 to about 1,500 degrees F. (sensitization range). Typically, the lower the carbon content, the lower the susceptibility of the austenitic stainless steel to intergranular corrosion. Austenitic stainless steel having carbon contents in the range of from about 0.03 to about 0.08 weight percent are stable when they have not been subjected to a temperature in the sensitization range. However, when such steels are exposed to a temperature in the sensitization range, chromium carbides will precipitate at the grain boundaries and the metal then becomes susceptible to attack by various corrosive media. Austenitic stainless steels with carbon contents less that 0.03 weight percent will not precipitate significant amounts of chromium carbides at the grain boundaries even after they have been subjected to a temperature in the sensitization range, thus exhibiting a higher corrosion resistance than comparable austenitic stainless steels with carbon contents greater than 0.03 weight percent.

The process by which the carbon is removed during sintering from austenitic stainless steel porous articles is not fully understood. It has, however, been empirically determined that it is generally not economically practical to obtain products with less than about 0.015 to 0.08 percent of carbon if the starting mixture contains more than about 1 percent carbon. This is thought to be the case because, even if the carbonaceous binder melts and/or volatilizes, enough carbon is diffused into the the metal from the liquid or vapor to undesirably increase its carbon content to levels well above 0.08 percent. For these reasons, the weight percent of the carbon in the stabilized suspension in the suspending medium to the weight of the particulate austenitic stainless steel should preferably be kept to less than about 0.25 percent of the weight of the metal particulate.

Substantially spherical particles may be used to provide a more tightly controlled pore size distribution uniformly distributed within the structure. Alternatively, metal fibers or metal fiber/metal powder combinations can be employed in the stabilized suspension.

In carrying out the method of this invention, an elongated, hollow cylindrical container is at least partially filled, preferably completely filled, with the stabilized suspension of dispersed metal particulate. The container or mold may be formed of any material capable of withstanding the sintering temperatures employed in the process. Examples of material that can be used include silicon carbide, silicon nitride, molybdenum and various ceramics. However, the coefficient of thermal expansion of the metal particulate must be substantially greater than that of the container or mold. This is necessary to maintain good support for the compacted particulate structure during the sintering step. A container or mold with a lower coefficient of thermal expansion than the metal particulate does not expand as much as the dried metal particulate structure as the sintering step is carried out. As a result, the metal particulate tends to press into the walls of the mold, thereby maintaining the shape and compacted nature of the structure until sintering is complete. Preferably, the coefficient of thermal expansion of the metal particulate is at least one and one-half times as great as that of the container or mold. For example, for the preferred ceramic containers of molds, as discussed below, the thermal coefficient of expansion generally is within the range of from about $1.0 \times 10^{-6}$ to about $4.0 \times 10^{-6}$ inches per inch per degree Fahrenheit. For the preferred stainless steel metal particulate, the coefficient of thermal expansion is generally in the range of from $6.0 \times 10^{-6}$ to about $9.0 \times 10^{-6}$ inches per inch per degree Fahrenheit.

As noted, ceramic tubes are the preferred structures for use as the mold or container. Tight tolerance, cylindrical ceramic tubes are available which will produce very uniform seamless porous metal cylindrical articles. In addition, ceramic tubes are not adversely affected by the sintering process and the formed metal article does not adhere to the ceramic material as a result of the sintering step. Accordingly, the container can be reused. Several examples of compositions of ceramic tubes are as follows:

(a) 99.8 percent $Al_2O_3$ (alumina) extruded to full density;

(b) 96.0 percent $Al_2O_3$ (alumina) extruded to full density;

(c) 85.0 percent mullite and 15.0 percent glass extruded to full density;

(d) 100 percent mullite extruded to full density;

(e) 80 percent $Al_2O_3$ and 20 percent $SiO_2$ slip-cast and isotactically pressed to 80 percent density.

The composition of the ceramic identified by the letter (e) above is the most preferred for use with the present invention. Ceramic tubes of this material exhibit good dimensional tolerances over a relatively long length. For example, ceramic tubes of this composition are available with standard camber (curvature) tolerances for tubes with diameters from 1 to 6 inches of no greater than 0.020 inch variation per linear foot and no greater variations in wall thickness than 0.005 inch, i.e., the concentricity of the inside diameter to the outside diameter is no greater than 0.005 inch. As the wall thickness of the ceramic tubes increases, the diameter tolerance becomes even tighter. The porous articles formed using ceramic tubes with these tight tolerances have comparable tight tolerances.

Prior to adding the stabilized suspension of dispersed metal particulate to the container, one end of the container is preferably sealed with, for example, a rubber stopper or other suitable means, e.g., in laboratory tests, adhesive tape has been used. The amount of stabilized suspension of dispersed metal particulate to be added is preferably the amount necessary to substantially completely fill the container. A filled container is preferred because it provides more uniform distribution of the metal particulate resulting in a product with a more uniform pore structure. Additionally, a completely filled container aids in start up because the center of gravity is more nearly coincident with the longitudinal axis of the cylinder. After adding the stabilized suspension to the container, it is then sealed and mounted on a structure capable of rotating the container about its longitudinal axis, preferably with the container in a substantially horizontal position. For example, a machine lathe, such as a Clausing lathe, or a spindle may be used. The container or mold is rotated at a high enough rate to provide a centrifugal acceleration at the interior wall of the formed structure equal to or greater than about 100, more preferably about 110, most preferably about 115, gravities (Gs) to obtain adequate compaction. It has been empirically determined that this provides the minimum force necessary to obtain adequate compaction to provide the aricles in accordance with this invention having the requisite uniform pore characteristics. By adequate compaction is meant the maximum amount of compaction which can be achieved without the application of external mechanical force, e.g., application of additional force by static mechanical means, such as a bladder inserted in the mold or container and inflated to press the formed structure against the interior wall of the mold. The rate of rotation required varies inversely with the diameter of article being formed. For example, for a two inch diameter porous article, the rate of rotation is about 2,000 rpm. For a one inch diameter article, the rate of rotation is about 3,000 rpm. For a one-half inch diameter article, the rate of rotation is about 4,000 rpm.

It may be desirable to construct a porous metal structure having a graded pore structure, e.g., a transition of pore sizes with the structure having larger particles, and therefore larger pores, near the exterior wall, and smaller particles, and therefore smaller pores, near the interior wall of the structure. One of the ways the method in accordance with the present invention can be used to provide such a structure is to introduce metal particulate of a broad particle size distribution into the stabilized suspension, and then rotate the container initially at a lower rate of revolution, thereby laying down a higher percentage of larger particles than of smaller particles over the interior wall of the mold, followed by an increase in the rate of rotation as the structure is formed, so that the smaller size or finer particles are distributed over the previously distributed larger particles so that the final or interior portion of the structure laid down comprises more smaller particles than it does larger particles and a graded pore structure with an outside-in configuration is formed. The final rate of rotation must be sufficiently high to provide at least about 100 Gs of centrifugal acceleration to obtain the desired level of compaction which provides the articles in accordance with this invention with the desired uniform pore characteristics. When operating in this manner, a lower concentration of metal particulate in the suspension is preferred.

A method for producing a graded structure, contemplated by the present invention, comprises laying down a first stabilized suspension on the interior of the container at a specified rate of rotation, removing the supernatant liquid, drying the material thus laid down and introducing another stabilized suspension containing metal particulate having a different particle size distribution than the first stabilized suspension, i.e., finer (or coarser) particles and repeating the procedure. A structure having any desired number of layers, with layers of varying pore size, can be produced in this manner. Further, the gradation of pore sizes from larger to smaller can be on either an inside-out or outside-in basis. Indeed, it is also within the scope of this invention to provide layers of different pore sizes in alternating fashion, e.g., a fine pored layer on the exterior of the structure, an intermediate layer of larger pore size, and an inner layer of fine pored material. As discussed above, the final rate of rotation with each stabilized suspension must be sufficiently high to provide at least about 100 Gs of centrifugal acceleration for each particular layer prior to its being dried. A preferred structure prepared by this technique comprises an external layer comprised of relatively finer sized metal particulate, e.g., −220, +325 austenitic stainless steel, and an inner layer of relatively coarser metal particulate, e.g., −50, +100 powder. A structure of this type with a nominal four inch outer diameter and in which the outer layer is about 0.015 inch thick and the inner layer is about 0.040 inch thick has properties which make it particularly useful for filtering gases.

The container is generally rotated at the desired rpm for from about 3 to about 5 minutes, following which it is stopped. Longer times may be used but have not been found to be necessary. Preferably, the container is allowed to slow down without being stopped abruptly, more preferably it is allowed to spin until its momentum runs out. The container is then removed from the rotating structure, supernatant fluid is removed, and the formed structure is dried in the container, preferably while in a horizontal position, to provide the structure with "green" or unsintered strength. Drying is preferably conducted in a convection oven at from about 100 to about 210 degrees Fahrenheit for about 30 to about 45 minutes or longer.

The container is then placed in a furnace, such as a vacuum furnace or reducing atmosphere furnace, most preferably a vacuum furnace, to remove volatile material and to fuse the individual particles of the metal particulate to each other. The sintering is best done with the structure in a vertical position to avoid distortion due to high creep rates of the metal particulate at elevated temperatures.

The sintering step itself is preferably carried out at a temperature high enough to promote solid state diffusion of metal atoms from one particle to another to form the sintered bonds. For stainless steel metal particulate, a temperature in the range of from about 1,600 to about 2,550 degrees F., more preferably from about 1,900 to about 2,525 degrees F., for a period of time of from about one to about eight hours has been found adequate .Preferably, the sintering step is carried out under a vacuum or in a pure hydrogen or other reducing atmosphere.

When lower melting materials are used, such as bronze, lower sintering temperatures may be used. For example, with bronze, temperatures in the range of from about 1,300 to about 1,900 degrees F. are adequate.

While the sintering step is preferably carried out at a temperature high enough to promote solid state diffusion as noted above, it can also be carried out using liquid phase sintering at relatively lower temperatures, e.g., using silver with stainless steel particulate or tin with copper.

In certain instances, it may be preferable to provide the dried structure with solid hardware members, typically at each end of the structure, and sinter them in situ, fusing the individual particles of the metal particulate to each other and fusing the solid hardware members to adjacent particles of the metal particulate to provide the structure with solid, closed pore or even porous end fitments, e.g., end caps. For example, a completed filter element can be provided by inserting (positioning) end caps and/or other connecting fittings in the ends of the container or mold prior to initiating rotation. Alternatively, the fitment can be inserted after the structure has been dried but prior to sintering. For example, it has been found that the dried structure has sufficient green strength (prior to sintering) that a threaded fitting can be screwed into it. During the subsequent sintering step, the metal particulate will form bonds between the individual particles and the solid metal members, thereby forming a completed filter element without the need for subsequent fabrication operations. Internal support members, such as a spiral reinforcing spring, can also be positioned in the container or mold for incorporation into the formed structure.

Upon completion of the sintering step, the resulting structure is cooled and then removed from the furnace. Upon cooling, the seamless porous metal structure will be easily removed from the container or mold due to the formation of sinter bonds between the individual metal particles of the metal particulate.

An advantage of using a ceramic tube is that there is no need to employ a releasing agent, e.g., a carbon mold releasing agent, to prevent the seamless structure from binding to the mold. The use of such releasing agents may contaminate the sintered structure and are difficult to remove. Accordingly, it is highly preferred to prepare the articles in accordance with this invention without the use of a release agent or any other coating material.

The cylindrical structure formed by the process above may be rolled, coined, swaged, welded, brazed, and/or resintered if desired. In the case where a solid member must be attached by welding to the structure, it has been observed that welding the porous structure is improved due to the uniform and non-stressed nature of the porous structure.

The porous metal articles in accordance with this invention typically have nominal diameters ranging from about ½ to about 6 inches, preferably from about 1 to about 4 inches, and wall thicknesses ranging from about 0.005 to about 1 inch, more preferably from about 0.005 to about 0.25 inch. As prepared, the lengths of the cylindrical structures will typically range from about 1, or even less, to about 48, or even higher, inches. The prepared structures may be cut into any desired lengths. Typically, the length to diameter (L/D) ratio of the structures as prepared will be less than about 100, more typically in the range of from about 1 to about 100. The porous metal articles in accordance with this invention typically have F2 ratings at beta=100 (as hereinafter defined) of from about 1 to about 100, preferably from about 5 to about 40, micrometers. The sintered structures in accordance with this invention have relatively high voids volume at a given efficiency relative to other sintered structures of this general type due to the uniformity of the formed structures in accordance with this invention and the relative absence of density variations typically present in sintered metal structures heretofore known to the art.

The F2 test used in making pore size measurements is a modified version of the F2 test developed in the 1970s at Oklahoma State University (OSU). In the OSU test, a suspension of an artificial contaminant in an appropriate test fluid is passed through the test filter while continuously sampling the fluid upstream and downstream of the filter under test. The samples are analyzed by automatic particle counters for their contents of five or more preselected particle diameters and the ratio of the upstream to downstream count is automatically recorded. This ratio is known in the industry as the beta ratio ($\beta$).

The beta ratio for each of the five or more diameters tested may be plotted as the ordinate against particle diameter as the abscissa, usually on a graph in which the ordinate is a logarithmic scale and the abscissa is a $\log^2$ scale. A smooth curve is then drawn between the points. The beta ratio for any diameter within the range tested can then be read from this curve. Efficiency at a particular particle diameter is calculated from the beta ratio by the formula:

Efficiency, percent = 100 (1 − 1/beta)

As an example, if beta=100, efficiency=99 percent.

Unless otherwise stated, the removal rating cited in the examples presented herein is the particle diameters at which beta=100; hence, the efficiency at the removal rating cited is 99 percent.

In the modified F2 test, efficiencies in the range of from 1 to 20 micrometers were determined using as a test contaminant a suspension of AC fine test dust, a natural silicious dust supplied by the AC Spark Plug Company. Prior to use, a suspension of the dust in water was mixed until the dispersion was stable. Test flow rate was ten liters per minute per square foot of filter area.

The Bubble Point tests referred to in the examples below were carried out at ambient temperature by submerging the appropriately end-capped porous, cylindrical metal article to be tested in a liquid bath of Filmex B (190 proof denatured ethyl alcohol available from Ashland Chemical Company) to wet out all the pores. (Prior to being placed in the bath, one end of the cylindrical structure was sealed while the other end was sealed to prevent liquid from entering the interior of the structure and attached to a source of dry air.) Pressure was then applied to the interior of the structure (the cylinders tested were two inches in diameter and four inches in length) and the pressure required for the first or initial bubble of air to appear on the exterior surface of the cylinder was recorded. The pressure was then increased until a flow rate of 20,000 cubic centimeters of air per minute per square foot of external surface area was flowing through the structure. This pressure was then recorded. For all of the examples set out below, the distribution of bubbles on the exterior surface of the cylinders tested at this point was observed to be quite uniform. After recording the pressure at this flow rate, the flow rate was increased to 60,000 cubic centimeters of air per minute per square foot of external surface area and the pressure again recorded, following which the pressure was increased to provide a flow rate of 90,000 cubic centimeters of air per minute per square foot of external surface area and the pressure required to maintain this flow rate recorded. The ratio of the pressure required to maintain the specified flow rates, i.e., 20,000, 60,000 and 90,000, to the pressure required to form the initial bubble is a measure of the uniformity of pore size in the formed structure. That is, the closer the ratio is to 1.0, the more uniform the pore size and the tighter the pore size distribution. To eliminate the effect of the pressure drop of the structure itself on this ratio, the clean pressure drop (that is, in air with no wetting of the pores) at each of the specified air flow rates of 20,000, 40,000 and 60,000 was measured and subtracted from the pressure drop measured at the corresponding flow rate when the structure was submerged in Filmex B prior to calculation of each of the ratios.

General Procedure Followed In Examples 1 to 4A

The porous articles in Examples 1 to 4A below were prepared using the general method described below. Where alternative procedures were followed in any of the following examples, such divergence from the general procedure set out below is described with regard to the particular example.

CARBOPOL 941 was combined with deionized water, the combination was mixed until uniform dispersion of the CARBOPOL was obtained and austenitic stainless steel particulate material (316L, having particles sizes as specified below) was then added and mixed to provide a uniform dispersion of the metal particulate in the liquid medium having the desired composition. The amounts of the CARBOPOL 941, water and metal particulate are specificed in Table 1 below.

An open, cylindrical ceramic container or mold having the composition set out under (e) above, an internal diameter of about 2 inches and a length of 22 inches was sealed at one end and then completely filled with the particular stabilized suspension. The open end of the ceramic container or mold was then sealed, enclosing the suspension within. The container was then mounted horizontally on a machine lathe, the lathe was started and the rate of rotation brought up to 2,000 rpm. Following a period of from about 3 to about 5 minutes at 2,000 rpm, the power to the lathe was terminated and the lathe was allowed to rotate to a stop. The container was then removed from the lathe, opened and supernatant fluid poured off. Alternatively, the supernatant fluid can be removed while the container is rotating by providing drain caps in the end caps which can be opened while the container is rotating (after the metal particulate has been laid down on the interior surface of the mold). The container with the formed structure therein was then placed horizontally in an oven at 300 to 350 degrees Fahrenheit from about 30 to about 45 minutes until the powder was dry.[1] The container was then placed vertically within a vacuum furnace and the dried metal structure therein was subjected to a sintering temperature (as specified in Table 2) for a period of 4 hours. The container was then cooled and removed from the furnace. The porous metal structure was then removed from the ceramic tube for testing. The results are set out in Tables 2 and 3 below.

[1] While a temperature in the range of 300 to 350 degrees Fahrenheit were used in these examples, it is preferred to use a lower drying temperature, e.g., 100 to 210 degrees Fahrenheit, to reduce the likelihood of disrupting the wet structure by the too rapid conversion of liquid in the structure to a gas.

TABLE 1

| Example | Nominal Average Particle Size[1] | Nominal Average Particle Size | Ratio of Metal Powder/ Carrier[2] |
|---|---|---|---|
| 1 | −100, +200 | 111μ | 3.68:1 |
| 1A | −100, +200 | 111μ | 3.68:1 |
| 2 | −200, +325 | 59μ | 4.01:1 |
| 2A | −200, +325 | 59μ | 4.01:1 |
| 3 | −200 | 45μ | 4.18:1 |
| 3A | −200 | 45μ | 4.18:1 |
| 4 | −325 | 34μ | 4.34:1 |
| 4A | −325 | 34μ | 4:34:1 |

[1] As used herein, this type of nomenclature, e.g., "−100, +200" mesh, refers to the characteristics of the particulate material. In this specific instance, −100 means it passes through a 100 mesh U.S. standard sieve while +200 means it does not pass through a 200 mesh U.S. standard sieve. Similarly, the nomenclature "−200" powder size refers to a powder in which all the particles will pass through a 200 mesh U.S. standard sieve.
[2] This ratio refers to the ratio of the weight of metal particulate to the weight of the carrier, i.e., the CARBOPOL 941 and deionized water. In all of these examples, the CARBOPOL 941 was present in an amount of 0.35 weight percent (based on the deionized water).

The porous metal articles of Examples 1–4A above had wall thicknesses in inches of 0.079, 0.078, 0.080 0.084, 0.076, 0.079, 0.068, and 0.077, respectively, and voids volumes of 66.0, 64.0, 61.8, 63.5, 59.2, 58.9, 51.1, and 52.0 percent, respectively.

TABLE 2

| Example | F2 at $\beta_{10}$ | F2 at $\beta_{100}$ | F2 at $\beta_\infty$ | Sintering Temperature (Degrees F.) |
|---|---|---|---|---|
| 1 | 19.9μ | 22.0μ | 25.0μ | 2450 |
| 1A | 20.0μ | 22.0μ | 25.0μ | 2450 |
| 2 | 12.7μ | 16.6μ | 20.1μ | 2380 |
| 2A | 11.2μ | 14.8μ | 17.7μ | 2380 |
| 3 | 8.9μ | 11.4μ | 13.0μ | 2380 |
| 3A | 9.1μ | 12.0μ | 14.0μ | 2380 |
| 4 | 4.9μ | 7.3μ | 9.8μ | 2380 |
| 4A | 4.9μ | 7.6μ | 11.8μ | 2380 |

The pressure required to obtain the first or initial Bubble Point in Filmex B as well as the pressure required to maintain flow rates of 20,000, 60,000 and 90,000, as described above, were determined and the ratio of the latter pressures to the pressure measured for the initial Bubble Point (after correction for the clean pressure drop) were calculated. The results are set out in Table 3 below.

TABLE 3

| Example[1] | First Bubble Point, inches H$_2$O | Pressure at 20,000 cc/min/ft$^2$, inches H$_2$O | Pressure at 60,000 cc/min/ft$^2$, inches H$_2$O | Pressure at 90,000 cc/min/ft$^2$, inches H$_2$O | Ratio of Pressure to Pressure of First Bubble Point |
|---|---|---|---|---|---|
| 1, 1A | 5.2 | 5.5 | 6.2 | 7.0 | 1.06 at 20,000 |
|  |  |  |  |  | 1.19 at 60,000 |
|  |  |  |  |  | 1.35 at 90,000 |
| 2, 2A | 11.2 | 14.8 | 15.8 | 16.5 | 1.32 at 20,000 |
|  |  |  |  |  | 1.41 at 60,000 |
|  |  |  |  |  | 1.45 at 90,000 |
| 3, 3A | 12.8 | 15.8 | 16.7 | 18.0 | 1.23 at 20,000 |
|  |  |  |  |  | 1.30 at 60,000 |
|  |  |  |  |  | 1.41 at 90,000 |
| 4, 4A | 19.4 | 21.0 | 23.8 | 27.5 | 1.08 at 20,000 |
|  |  |  |  |  | 1.23 at 60,000 |

TABLE 3-continued

| Example[1] | First Bubble Point, inches H₂O | Pressure at 20,000 cc/min/ft², inches H₂O | Pressure at 60,000 cc/min/ft², inches H₂O | Pressure at 90,000 cc/min/ft², inches H₂O | Ratio of Pressure to Pressure of First Bubble Point |
|---|---|---|---|---|---|
| | | | | | 1.42 at 90,000 |

[1]The measurements reported in Table 3 were carried out on porous, cylindrical metal tubes prepared contemporaneously (in the same run from the same stabilized suspension) with those for which the data is presented in Table 2. The results reported in Table 3 were carried out on sections of the tubes so formed and not necessarily on the same tube section from which the data in Table 2 was generated.

The ratios of the pressures at the specified flow rates, i.e., 20,000, 60,000 and 90,000, to the pressure required to form the first or initial Bubble Point were all below 1.5. These relatively low ratios reflect the substantially uniform pore structures of the porous articles prepared by the method in accordance with the invention. As used herein for purposes of describing the uniform pore characteristics of the porous articles in accordance with the invention, the term "Bubble Point ratio" refers to the ratio of the pressure required to maintain a flow rate of 90,000 cubic centimeters per square foot (in the test method set out above and with the clean pressure drop at a flow rate of 90,000 cubic centimeters of dry air per minute per square foot of surface area subtracted from the measured value prior to calculating the ratio) to the pressure required for the first bubble of air to appear (as described in the test method set out above).

The results described above demonstrate that the porous articles in accordance with this invention provide structures with uniform pore characteristics. Further, the articles, because of their method of manufacture, do not suffer from the drawbacks associated with welded structures.

I claim:

1. A method of manufacturing a seamless, hollow, porous article comprising:
   (a) rotating a mold containing a stabilized suspension of a metal particulate at a rate and for a time such that said particulate is separated from said suspension and distributed on the interior wall of said mold, thereby forming a structure conforming to the interior wall of said mold and supernatant fluid, the rate of rotation being sufficiently high that at least about 100 Gs of acceleration is achieved at the interior wall of said structure;
   (b) removing said supernatant fluid and drying said structure to provide a dried structure having green or unsintered strength;
   (c) sintering the dried structure to remove volatile material and fuse the individual particles of said particulate to each other to form a seamless, hollow, porous article; and
   (d) removing the seamless, hollow, porous article from said mold.

2. The method of claim 1 wherein said mold is substantially completely filled with said stabilized suspension.

3. The method of claim 2 wherein the rate of rotation is at such that at least about 110 Gs of acceleration is achieved at the interior wall of said structure.

4. The method of claim 3 wherein the weight ratio of said metal particulate in said stabilized suspension to the other components therein is from about 5:1 to about 1:1.

5. The method of claim 4 wherein said metal particulate is stainless steel, said mold is ceramic and said sintering is carried out at a temperature in the range of from about 1,600 to about 2,550 degrees F.

6. The method of claim 5 wherein said metal particulate is austenitic stainless steel, the weight ratio of said metal particulate in said stabilized suspension to the other components therein is from about 4.5:1 to about 3.5:1 and said sintering is carried out at a temperature in the range of from about 1,900 to about 2,525 degrees F.

7. The method of claim 6 wherein said stabilized suspension comprises (1) water, (2) a stabilizing/binding agent comprising a polyacrylic acid and (3) austenitic stainless steel particles having average particle sizes in the range of from about 25 to about 150 micrometers, the weight ratio of said metal particulate in said stabilized suspension to the other components therein is in the range of from about 3.5:1 to about 4.5:1, said mold has an inside diameter in the range of from about 1 to about 4 inches and an L/D of from about 1 to about 100, said stainless steel particles have a coefficient of thermal expansion at least one and one-half times as great as said mold, the rotation of said mold is carried out with said mold in a horizontal position, said drying is carried out with said mold in a horizontal position, said sintering is carried out with said mold in a vertical position and the formed seamless, hollow porous article has a wall thickness of from about 0.005 to about 0.25 of an inch, an F2 rating at beta equal 100 of from about 1 to about 100 micrometers and a Bubble Point ratio of about 1.5 or less.

8. The method of claim 1 wherein the rotation of said mold is carried out with said mold in a horizontal position, said drying step is carried out with said mold in a horizontal position and said sintering is carried out in a vertical position.

9. The method of claim 1 wherein steps (a) and (b) are repeated at least once with at least a second stabilized suspension of a second metal particulate having a different particle size distribution than that of the first stabilized suspension prior to carrying out step (c) thereby forming a seamless, hollow, porous article with a layered structure.

10. The method of claim 1 wherein one or more fitments is inserted into said mold prior to said sintering.

11. A method for manufacturing a seamless, hollow, porous article having a graded pore structure comprising:
   (a) rotating a mold containing a stabilized suspension of a metal particulate having a distribution of particle sizes dispersed in a fluid medium, said mold having a coefficient of thermal expansion less than that of said metal particulate, at a first lower rate to first separate larger size particles from said suspension and distribute them over the interior wall of said mold;
   (b) rotating said mold at at least one higher rate of revolution to separate smaller size particles from said suspension and distribute them over the previously distributed larger particles, thereby forming a structure conforming to the interior wall of said mold and supernatant fluid, said mold being rotated at a rate such that at least about 100 Gs of acceleration is achieved at the interior wall of said structure;

(c) removing said supernatant fluid and drying said structure to provide a dried structure having green or unsintered strength;

(d) sintering the dried structure to remove volatile material and fuse the individual particles of said particulate to each other to form a seamless, hollow, porous article having a graded pore structure; and (e) removing the seamless, hollow, porous article having a graded pore structure from said mold.

12. The method of claim 11 wherein said mold is substantially completely filled with said stabilized suspension.

13. The method of claim 12 wherein the rate of rotation is at such that at least about 110 Gs of acceleration is achieved at the interior wall of said structure.

14. The method of claim 13 wherein the weight ratio of said metal particulate in said stabilized suspension to the other components therein is from about 5:1 to about 1:1.

15. The method of claim 14 wherein said metal particulate is stainless steel, said mold is ceramic and said sintering is carried out at a temperature in the range of from about 1,600 to about 2,550 degrees F.

16. The method of claim 15 wherein said metal particulate is austenitic stainless steel, the weight ratio of said metal particulate in said stabilized suspension to the other components therein is from about 4.5:1 to about 3.5:1 and said sintering is carried out at a temperature in the range of from about 1,900 to about 2,525 degrees F.

17. The method of claim 16 wherein said stabilized suspension comprises (1) water, (2) a stabilizing/binding agent comprising a polyacrylic acid and (3) austenitic stainless steel particles having average particle sizes in the range of from about 25 to about 150 micrometers, the weight ratio of said metal particulate in said stabilized suspension to the other components therein is in the range of from about 3.5:1 to about 4.5:1, said mold has an inside diameter in the range of from about 1 to about 4 inches and an L/D of from about 1 to about 100, said stainless steel particles have a coefficient of thermal expansion at least one and one-half times as great as said mold, the rotation of said mold is carried out with said mold in a horizontal position, said drying is carried out with said mold in a horizontal position, said sintering is carried out with said mold in a vertical position and the formed seamless, hollow porous article has a wall thickness of from about 0.005 to about 0.25 of an inch, an F2 rating at beta equal 100 of from about 1 to about 100 micrometers and a Bubble Point ratio of about 1.5 or less.

18. The method of claim 11 wherein the rotation of said mold is carried out with said mold in a horizontal position, said drying step is carried out with said mold in a horizontal position and said sintering is carried out in a vertical position.

19. The method of claim 11 wherein one or more fitments is inserted into said mold prior to said sintering.

20. A seamless, hollow porous metal article of substantially uniform diameter, wall thickness and pore structure comprising metal particulate in which the individual particles of said particulate are bonded to each other and said article has a Bubble Point ratio of about 1.5 or less.

21. The porous metal article of claim 20 wherein said article has a graded pore structure.

22. The porous metal article of claim 21 wherein said particulate is stainless steel.

23. The porous metal article of claim 22 wherein said article has a wall thickness of from about 0.005 to about 1 inch.

24. The porous metal article of claim 23 wherein said article has an F2 rating at beta equals 100 of from about 1 to about 100 micrometers.

25. The porous metal article of claim 24 wherein said stainless steel is austenitic stainless steel and said article has a wall thickness of from about 0.005 to about 0.25 of an inch.

26. The porous metal article of claim 25 wherein said article comprises a finer pored outer layer and a coarser pored inner layer.

27. The porous metal article of claim 26 wherein said outer layer is about 0.015 inches thick and said inner layer is about 0.040 inches thick.

28. The porous metal article of claim 27 wherein said article has a nominal 4 inch outer diameter, said outer layer comprises metal particulate having a nominal particle size of −50, +100, and said inner layer comprises metal particulate having a nominal particle size of −200, +325.

29. The porous metal article of claim 27 wherein said article has one or more fittings sinter-bonded to said article.

30. The porous metal article of claim 24 wherein said article has an F2 rating at beta equals 100 of from about 5 to about 40 micrometers.

* * * * *